United States Patent
Boxer et al.

(10) Patent No.: US 6,889,272 B1
(45) Date of Patent: May 3, 2005

(54) PARALLEL DATA BUS WITH BIT POSITION ENCODED ON THE CLOCK WIRE

(75) Inventors: Lawrence Aaron Boxer, Carlisle, MA (US); Dan Castagnozzi, Lexington, MA (US)

(73) Assignee: Applied Micro Circuits Corporation, San Diego, CA (US)

(*) Notice: Subject to any disclaimer, the term of this patent is extended or adjusted under 35 U.S.C. 154(b) by 372 days.

(21) Appl. No.: 10/016,540

(22) Filed: Oct. 26, 2001

Related U.S. Application Data (60) Provisional application No. 60/245,895, filed on Nov. 3, 2000.

(51) Int. Cl.[7] .............................................. G06F 13/38
(52) U.S. Cl. ............................ 710/65; 710/35; 710/61; 710/66; 710/71; 713/500; 713/503; 713/600
(58) Field of Search .............................. 710/35, 61, 65, 710/66, 71; 713/500–601; 375/219, 220; 341/61; 370/503–506

(56) References Cited

U.S. PATENT DOCUMENTS

| | | | | |
|---|---|---|---|---|
| 5,426,644 A | * | 6/1995 | Fujimoto | 370/535 |
| 5,887,039 A | * | 3/1999 | Suemura et al. | 375/365 |
| 5,920,897 A | * | 7/1999 | Jin et al. | 711/167 |
| 6,167,077 A | * | 12/2000 | Ducaroir et al. | 375/219 |
| 6,262,998 B1 | * | 7/2001 | Hogeboom | 370/503 |
| 6,452,927 B1 | * | 9/2002 | Rich | 370/395.1 |
| 6,484,268 B2 | * | 11/2002 | Tamura et al. | 713/600 |
| 6,560,275 B2 | * | 5/2003 | Lecourtier et al. | 375/220 |

\* cited by examiner

*Primary Examiner*—Jeffrey Gaffin
*Assistant Examiner*—Mike Nguyen
(74) *Attorney, Agent, or Firm*—Weingarten, Schurgin, Gagnebin & Lebovici LLP (57) ABSTRACT

A system and method for transmitting parallel data from a source to a destination over a plurality of high speed serial lines operates reliably even in the presence of data skew. The high speed data transmission system includes a protocol generator, a de-skew circuit, and a plurality of high speed serial lines coupled between the protocol generator and the de-skew circuit. Respective serial representations of parallel data words are transmitted to the destination over a plurality of serial data lines, and a clock signal is transmitted to the destination over a clock line in parallel with the serial data lines. The clock signal has at least one data bit of each parallel data word encoded thereon. The de-skew circuit aligns regenerated parallel data words using the respective data bits encoded on the clock signal to eliminate skew among the data bits, and regenerates the parallel data from the aligned parallel data words.

14 Claims, 4 Drawing Sheets

PARALLEL DATA BUS WITH BIT POSITION ENCODED ON THE CLOCK WIRE

CROSS REFERENCE TO RELATED APPLICATIONS

This application claims priority of U.S. Provisional Patent Application No. 60/245,895 filed Nov. 3, 2000 entitled PARALLEL DATA BUS WITH BIT POSITION ENCODED ON THE CLOCK WIRE.

STATEMENT REGARDING FEDERALLY SPONSORED RESEARCH OR DEVELOPMENT

N/A

BACKGROUND OF THE INVENTION

The present invention relates generally to high speed data transmission systems, and more specifically to a system and method for reliably transmitting parallel data over a plurality of high speed serial lines.

Data transmission systems are known that employ a plurality of serial lines for transmitting parallel data from a source to a destination. In a conventional data transmission system, parallel data to be transmitted is typically segregated into a plurality of narrower parallel data bytes or words. Next, the plurality of parallel data bytes/words is serialized for transmission to the destination over a plurality of serial lines. At the destination, serial data streams carried by the respective lines are converted from serial to parallel form to reproduce the plurality of parallel data bytes/words, which are then aligned to regenerate the parallel data with its original ordering of data.

One drawback of the above-described data transmission system is that variations in, e.g., the lengths of the serial lines and/or the logic speeds associated with the serial lines can cause the serial data streams carried by the respective lines to be skewed. For example, corresponding data bits included in the serial data streams may arrive at the destination during different clock periods. This can be particularly problematic for high speed data transmission systems employing serial data transmission rates on the order of, e.g., 2.5 GHz, which may require corresponding serialized data bits to arrive during the same 400 psec clock period. Such data skew can make it difficult to align the data received at the destination and regain the original ordering of the transmitted parallel data.

Various encoding techniques have been developed to address, at least in part, the problem of data skew in the transmission of data over high speed serial lines.

One such encoding technique, commonly known as the 8B/10B data transmission code, segregates the parallel data to be transmitted into a plurality of parallel data bytes, and encodes the parallel data bytes to form corresponding 10-bit parallel data words, which are then serialized for transmission to the destination over respective lines. Each 10-bit parallel data word is typically encoded to include alignment information, which is used at the destination for properly aligning the parallel data despite the occurrence of data skew. However, the 8B/10B data encoding technique also has drawbacks. For example, because the wider 10-bit parallel data words are serialized for transmission to the destination over the serial lines rather than the narrower parallel data bytes, the serial data transmission rate is frequently increased to achieve a desired level of performance.

It would therefore be desirable to have an improved system and method for transmitting parallel data from a source to a destination over a plurality of high speed serial lines. Such a high speed data transmission system would be capable of reliably transmitting parallel data to the destination despite the occurrence of data skew. It would also be desirable to have a high speed data transmission system that can reliably transmit parallel data without requiring an increase in the serial data transmission rate.

BRIEF SUMMARY OF THE INVENTION

In accordance with the present invention, a system and method for transmitting parallel data from a source to a destination over a plurality of high speed serial lines is provided that operates reliably even in the presence of data skew. Benefits of the presently disclosed invention are achieved by encoding alignment information for the parallel data on a clock transmitted to the destination over one of the high speed serial lines.

In one embodiment, the high speed data transmission system includes a protocol generator, a de-skew circuit, and a plurality of high speed serial lines coupled between the protocol generator and the de-skew circuit.

Serial data streams are transmitted over the plurality of high speed serial lines at a predetermined serial data transmission rate. The protocol generator, which operates at a suitable fraction of the predetermined serial data transmission rate, is configured to input information from a wide bus and output information to a plurality of narrower buses. In the presently disclosed embodiment, the predetermined serial data transmission rate is equal to 2.5 GHz, and the protocol generator inputs information from a single 128-bit bus at 311 MHz and outputs information to seventeen (17) 8-bit buses at 311 MHz.

The information that is inputted by the protocol generator from the wide bus comprises parallel data to be transmitted to the destination. Further, the information that is outputted by the protocol generator to the narrower buses comprises a plurality of parallel bytes conforming to a predetermined protocol. One of the parallel bytes is used to generate a clock, while the remaining parallel bytes comprise the parallel data to be transmitted to the destination. The parallel byte for generating the clock has alignment information encoded thereon, which is subsequently used for properly aligning the parallel data bytes at the destination to regain the original data ordering of the parallel data. In the presently disclosed embodiment, the alignment information encoded on the clock comprises at least one data bit of each parallel data byte.

The information that is outputted by the protocol generator to the plurality of narrow buses is serialized before being transmitted to the destination over the plurality of high speed serial lines. At the destination, the serial data streams carried by the respective lines are converted from serial to parallel form to reproduce the plurality of parallel bytes.

The de-skew circuit, which also operates at a suitable fraction of the predetermined serial data transmission rate, is configured to input the plurality of reproduced parallel bytes from a plurality of narrow buses and output parallel data comprising the parallel data bytes to a wider bus. In the disclosed embodiment, the de-skew circuit inputs the parallel bytes from seventeen (17) 8-bit buses at 311 MHz and outputs the parallel data to a single 128-bit bus at 311 MHz. One of the inputted parallel bytes is derived from the clock, and the remaining sixteen (16) parallel bytes comprise the transmitted parallel data. The parallel data outputted by the de-skew circuit has the same data ordering as the parallel data originally inputted by the protocol generator.

The de-skew circuit is further configured to use the alignment information encoded on the bytes derived from the clock for properly aligning the parallel data bytes before outputting the parallel data over the wide bus. In the disclosed embodiment, the predetermined protocol requires that the alignment information encoded on the clock include a single bit from each of the parallel data bytes. Specifically, the alignment information includes the Most Significant Bit (MSB) of the upper nibble of a first parallel data byte, and the MSB of the lower nibble of a next contiguous parallel data byte. The alignment information then alternates between including the MSB of the upper nibble and the MSB of the lower nibble of subsequent contiguous parallel data bytes until a single bit from each of the sixteen (16) parallel data bytes is encoded on the clock.

The de-skew circuit selects respective bit positions in the bytes derived from the clock and the first parallel data byte, and compares the bits in the selected bit positions a predetermined number of times. In the event the de-skew circuit detects no mismatches, it is concluded that the position of the single bit from the first parallel data byte included in the alignment information is located in the same bit position in both the bytes derived from the clock and the first parallel data byte. The above-described steps are then repeated for a next contiguous parallel data byte.

In the event the de-skew circuit detects a mismatch, the de-skew circuit selects another bit position in the bytes derived from the clock and/or the first parallel data byte and repeats the above-described comparisons). In the event the de-skew circuit successively selects each bit position in the bytes derived from the clock and/or the first parallel data byte and detects a mismatch for each bit position, it is concluded that a bit error has occurred on one of the serial lines. The above-described steps may then be repeated for the first parallel data byte.

In the event the de-skew circuit repeats the above-described steps and detects no mismatches for the next contiguous parallel data byte, the relative bit positions of the first and the next contiguous parallel data bytes are determined at the destination and these contiguous data bytes are then aligned. In the disclosed embodiment, the de-skew circuit aligns the contiguous data bytes by temporarily storing the data bytes in a memory or buffer with the data bits in their original order.

The above-described steps are then repeated for each remaining parallel data byte. In the event the de-skew circuit detects no mismatches for the remaining parallel data bytes, the relative bit positions of the sixteen (16) contiguous parallel data bytes are determined and the contiguous data bytes are properly aligned. Finally, the de-skew circuit outputs the parallel data comprising the de-skewed parallel data bytes over the wide bus with the original ordering of data restored.

By encoding alignment information, i.e., data bit positions, on a clock transmitted with parallel data to a destination over a plurality of high speed serial lines, the transmitted parallel data can be de-skewed at the destination to regain the original ordering of the data. Because the parallel data is not encoded to include additional bits before being serialized and transmitted to the destination (as in, e.g., the 8B/10B data encoding technique), the serial data transmission rate need not be increased to achieve a desired performance level.

Other features, functions, and aspects of the invention will be evident from the Detailed Description of the Invention that follows.

BRIEF DESCRIPTION OF THE SEVERAL VIEWS OF THE DRAWING

The invention will be more fully understood with reference to the following Detailed Description of the Invention in conjunction with the drawings of which.

DETAILED DESCRIPTION OF THE INVENTION

U.S. Provisional Patent Application No. 60/245,895 filed Nov. 3, 2000 is incorporated herein by reference.

A system and method for transmitting parallel data from a source to a destination over a plurality of high speed serial lines is disclosed that operates reliably despite the occurrence of data skew. Such reliable operation is achieved by encoding alignment information relating to selected bit positions of the parallel data on a clock transmitted to the destination over one of the high speed serial lines, and using the alignment information at the destination to regain the original ordering of the data.

Figure 1:
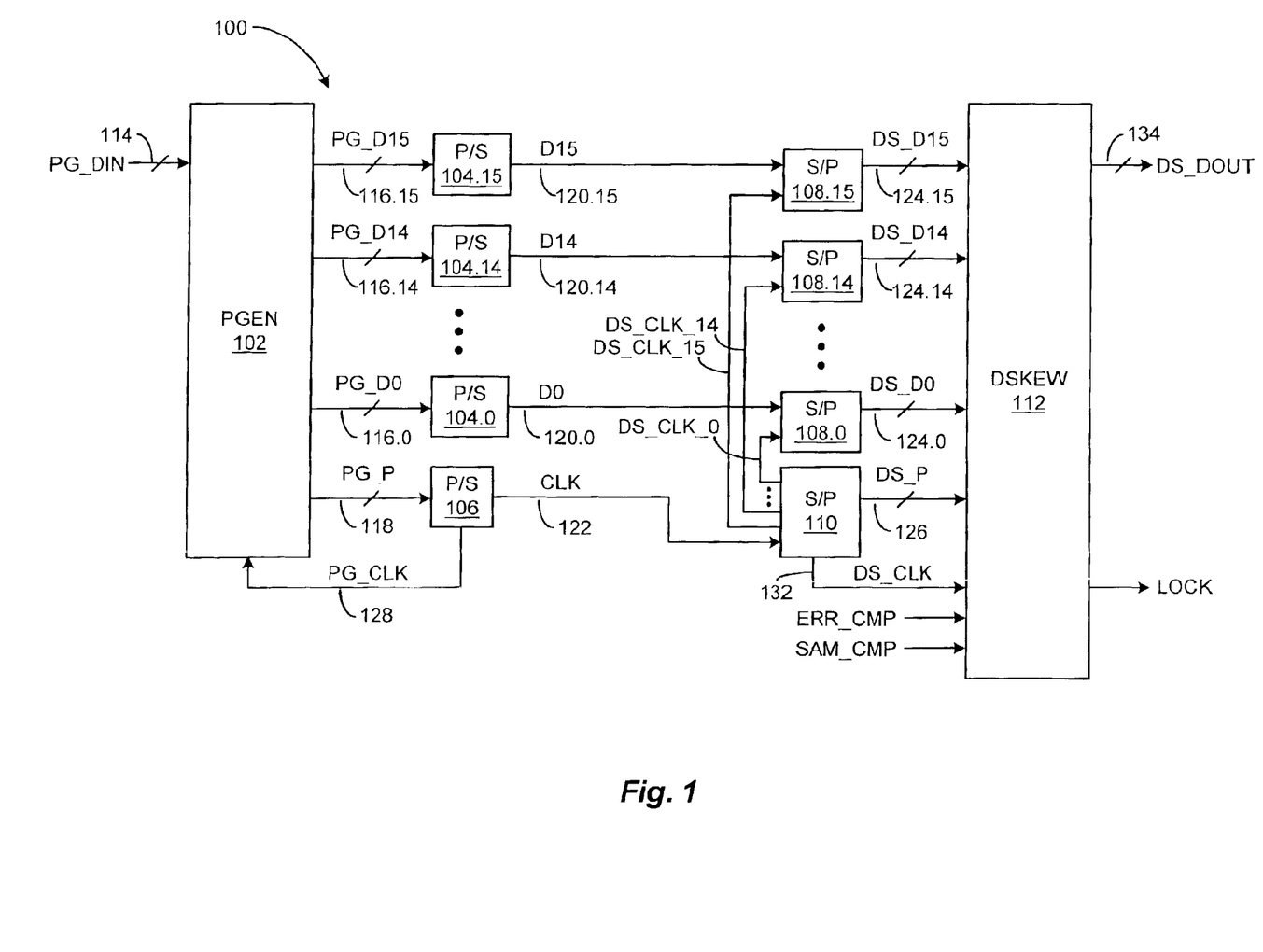
FIG. 1 is a block diagram depicting a high speed data transmission system according to the present invention.

FIG. 1 depicts an illustrative embodiment of a high speed data transmission system 100, in accordance with the present invention. In the illustrated embodiment, the high speed data transmission system 100 includes a protocol generator 102, a de-skew circuit 112, and a plurality of high speed serial lines 120.0–120.15 and 122 coupled between the protocol generator 102 and the de-skew circuit 112. The protocol generator 102 is configured to input parallel data PG_DIN from a wide bus 114, and output segregated parallel data PG_D0–PG_D15 over a plurality of narrower buses 116.0–116.15 and clock protocol data PG_P over a narrower bus 118.

The data transmission system 100 further includes a plurality of Parallel/Serial (P/S) converters 104.0–104.15 configured to convert the segregated parallel data PG_D0–PG_D15 to serial data D0–D15, respectively, for transmission over the plurality of high speed serial lines 120.0–120.15; and, a P/S converter 106 configured to convert the clock protocol data PG_P to a clock CLK having a predetermined clock rate for transmission over the high speed serial line 122. The P/S converter 106 is further configured to generate a clock PG_CLK on a line 128 for use by the protocol generator 102 in generating the parallel data PG_D0–PG_D15 and the clock protocol data PG_P. In the illustrated embodiment, the PG_CLK clock rate is a suitable fraction of the CLK clock rate.

Moreover, the data transmission system 100 includes a plurality of Serial/Parallel (S/P) converters 108.0–108.15 configured to convert the serialized data D0–D15 to parallel data DS_D0–DS_D15, respectively; and, an S/P converter 110 configured to convert the clock CLK to clock protocol data DS_P. The S/P converter 110 is further configured to recover clocks DS_CLK_0–DS_CLK_15 for use by the S/P converters 108.0–108.15, respectively, and a clock DS_CLK for use by the de-skew circuit 112, from the clock CLK. In the illustrated embodiment, the clock rate of each clock DS_CLK_0–DS_CLK 15 is equal to the CLK clock rate, and the DS_CLK clock rate is a suitable fraction of the CLK clock rate. The P/S converters 104.0–104.15 and 106 and the S/P converters 108.0–108.15 and 110 may comprise conventional circuitry for recovering clocks and serial/parallel data.

The de-skew circuit 112 is configured to input the parallel data DS_D0–DS_D15 via a plurality of narrow buses 124.0–124.15, respectively, and the clock protocol data DS_P via a narrow bus 126; and, output parallel data DS_DOUT over a wider bus 134. The de-skew circuit 112 uses the clock protocol data DS_P for properly aligning the parallel data DS_D0–DS_D15. Further, the de-skew circuit 112 inputs control values ERR_CMP and SAM_CMP, and outputs a control signal LOCK, the functions of which are described below.

The parallel data DS_D0–DS_D15 essentially comprises a reproduction of the parallel data PG_D0–PG_D15, respectively, and the clock protocol data DS_P essentially comprises a reproduction of the clock protocol data PG_P. It is noted, however, that the relative bit positions of the parallel data DS_D0–DS_D15 may be skewed as a result of the data transmission from the protocol generator 102 to the de-skew circuit 112 over the high speed serial lines 120.0–120.15.

In the illustrated embodiment, the plurality of serial lines 120.0–120.15 is configured to run at about 2.5 GHz. Similarly, the clock CLK on the serial line 122 has a clock rate of about 2.5 GHz, and the clocks DS_CLK_0–DS_CLK_15 recovered by the S/P converter 110 have clock rates of about 2.5 GHz. Further, the clock PG_CLK generated by the P/S converter 106 and the clock DS_CLK recovered by the S/P converter 110 have clock rates of one-eighth the CLK clock rate or about 311 MHz. Moreover, each of the buses 114 and 134 is 128 bits wide, and each of the buses 116.0–116.15, 118, 124.0–124.15, and 126 is 8 bits wide. It should be understood, however, that in alternative embodiments, the data transmission system 100 may be configured to comprise wider or narrower buses running at higher or lower clock rates.

It should be further understood that the functions of the data transmission system 100 described herein may be software-driven and executable out of a memory by a processor, embodied in part or in whole using hardware components such as custom or semi-custom integrated circuits such as Application Specific Integrated Circuits (ASICs), controllers, or other hardware components or devices, or a combination of hardware components and software. In the illustrated embodiment, the protocol generator 102 and the de-skew circuit 112 are embodied in one or more CMOS ASICS.

Figure 2:
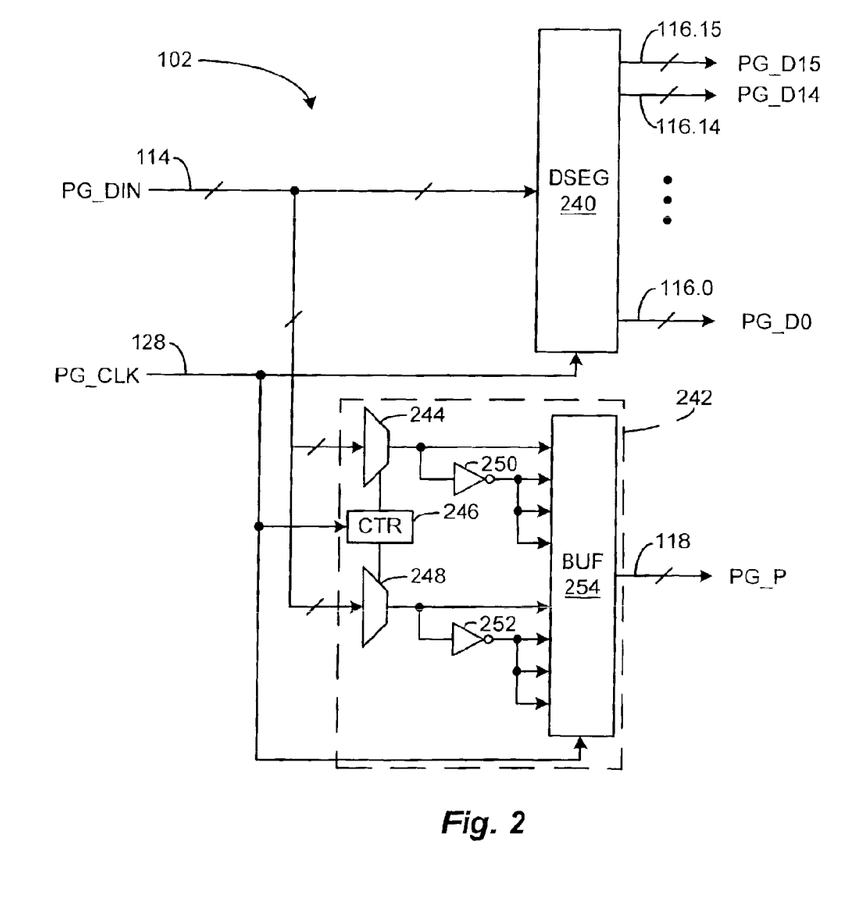
FIG. 2 is a block diagram depicting a protocol generator included in the high speed data transmission system of FIG. 1.

FIG. 2 depicts an illustrative embodiment of the protocol generator 102 included in the high speed data transmission system 100 (FIG. 1). In the illustrated embodiment, the protocol generator 102 inputs the parallel data PG_DIN carried by the bus 114, and outputs the segregated parallel data PG_D0–PG_D15 over the plurality of buses 116.0–116.15 and the clock protocol data PG_P over the bus 118, in accordance with a predetermined bus protocol.

Figure 4:
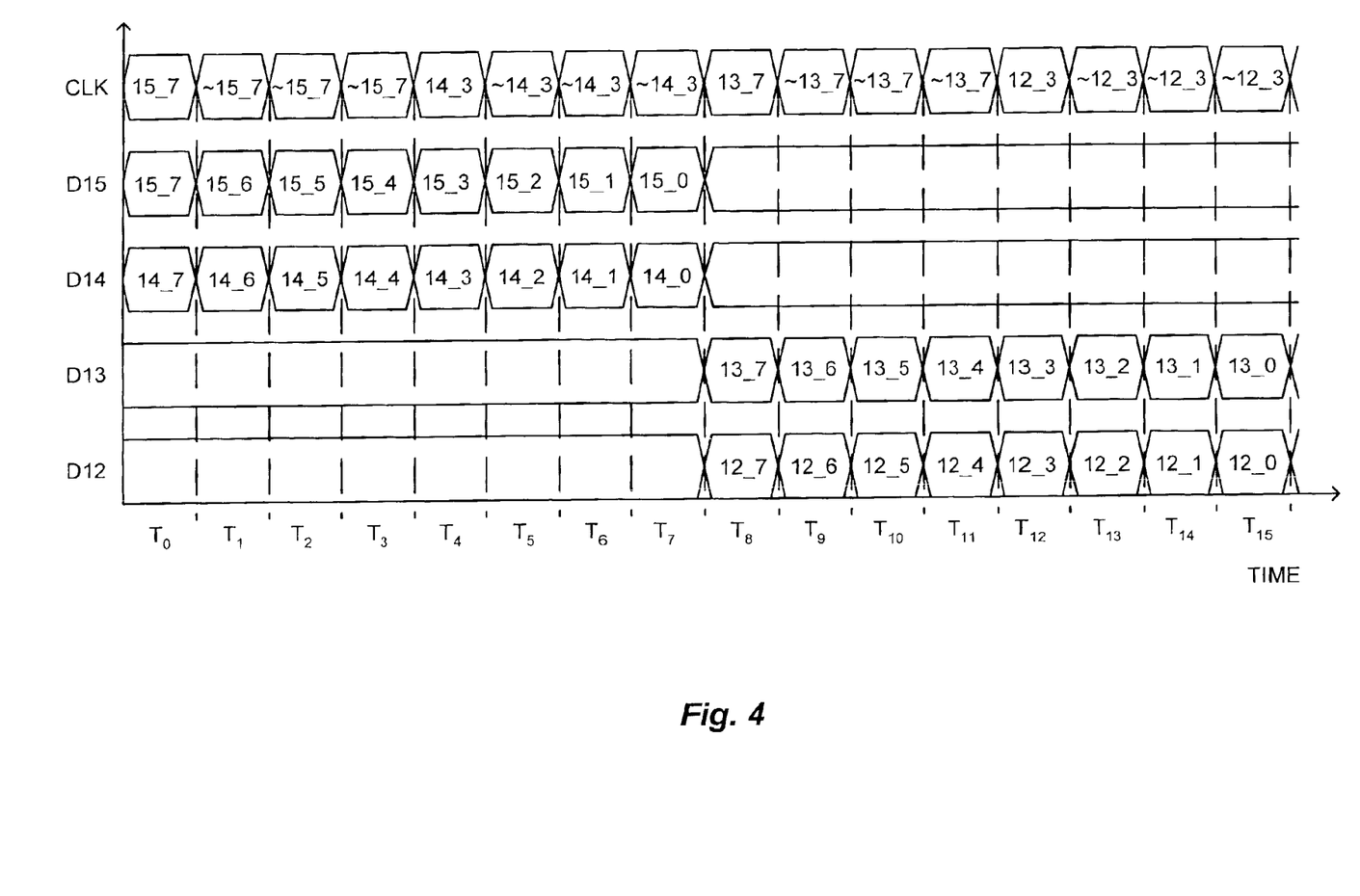
FIG. 4 is a timing diagram depicting a bus protocol employed by the high speed data transmission system of FIG. 1.

FIG. 4 depicts an exemplary bus protocol employed by the protocol generator 102 for outputting the parallel data PG_D0–PG_D15 and the clock protocol data PG_P. As described above, the serial data D0–D15 and the clock CLK are derived from the parallel data PG_D0–PG_D15 and the clock protocol data PG_P, respectively. It is noted that FIG. 4 omits an explicit depiction of the bus protocol for the serial data D0–D11 for clarity of discussion. It is further noted that FIG. 4 depicts bit positions of the serial data D12–D15 relative to the clock CLK with no skew among the data bits.

As mentioned above, each of the buses 116.0–116.15 and 118 is disclosed as being 8 bits wide. FIG. 4 therefore depicts the relative positions of bits 15_7–15_0 of serial data D15, bits 14_7–14_0 of serial data D14, bits 13_7–13_0 of serial data D13, and bits 12_7–12_0 of serial data D12. Specifically, in the event there is no data skew, bits 15_7–15_0 and bits 14_7–14_0 are asserted during a time interval $T_0$–$T_7$, and bits 13_7–13_0 and bits 12_7–12_0 are asserted during a time interval $T_8$–$T_5$. It follows that bits 11_7–11_0 of serial data D11 and bits 10_7–10_0 of serial data D10 are asserted during a time interval $T_{16}$–$T_{23}$, bits 9_7–9_0 of serial data D9 and bits 8_7–8_0 of serial data D8 are asserted during a time interval $T_{24}$–$T_{31}$, bits 7_7–7_0 of serial data D7 and bits 6_7–6_0 of serial data D6 are asserted during a time interval $T_{32}$–$T_{39}$, bits 5_7–5_0 of serial data D5 and bits 4_7–4_0 of serial data D4 are asserted during a time interval $T_{40}$–$T_{47}$, bits 3_7–3_0 of serial data D3 and bits 2_7–2_0 of serial data D2 are asserted during a time interval $T_{48}$–$T_{55}$, and bits 1_7–1_0 of serial data D1 and bits 0_7–0_0 of serial data D0 are asserted during a time interval $T_{56}$–$T_{63}$.

In the illustrated embodiment, alignment information comprising a single data bit from each of the serial data D0–D15 is included on the clock CLK. As shown in FIG. 4, bit 15_7 of serial data D15, bit 14_3 of serial data D14, bit 13_7 of serial data D13, and bit 12_3 of serial data D12 are included on the clock CLK. It follows that bit 11_7 of serial data D11, bit 10_3 of serial data D10, bit 9_7 of serial data D9, bit 8_3 of serial data D8, bit 7_7 of serial data D7, bit 6_3 of serial data D6, bit 5_7 of serial data D5, bit 4_3 of serial data D4, bit 3_7 of serial data D3, bit 2_3 of serial data D2, bit 1_7 of serial data D1, and bit 0_3 of serial data D0 are also included on the clock CLK. It is noted that the relative positions of the data bits 15_7, 14_3, 13_7, 12_3, 11_7, 10_3, 9_7, 8_3, 7_7, 6_3, 5_7, 4_3, 3_7, 2_3, 1_7, and 0_3 on the clock CLK are indicative of the relative positions of these bits in the serial data D15–D0 with no data skew.

It is further noted that, in accordance with the presently disclosed bus protocol, the clock CLK includes the bit 15_7 during time interval $T_0$ and inverted versions of the bit 15_7 (shown as "~15_7") during time intervals $T_1$–$T_3$. The clock CLK similarly includes inverted bits ~14_3, ~13_7, ~12_3, ~11_7, ~10_3, ~9_7, 8_3, ~7_7, ~6_3, ~5_7, ~4_3, ~3_7, ~2_3, ~1_7, and ~0_3 during the three time intervals immediately following the respective assertions of these bits without inversion. In this way, it is assured that the edge density of the clock CLK is sufficient to allow the S/P converter 110 to recover the clocks DS_CLK_0–DS_CLK_15 from the clock CLK.

It should be understood that alternative bus protocols may be employed in which alignment information comprising one or more data bits from each of the serial data D0–D15 are included on the clock CLK, so long as the clock CLK has sufficient edge density to allow recovery of the clocks DS_CLK_0—DS_CLK_15.

As shown in FIG. 2, the protocol generator 102 includes a parallel data segregator 240 and a clock protocol data generator 242. The parallel data segregator 240 is configured to input the parallel data PG_DIN at the PG_CLK clock rate, and output the segregated parallel data PG_D0–PG_

D15 at the PG_CLK clock rate so that the serial data D0–D15 derived therefrom conforms to the bus protocol depicted in FIG. 4. Similarly, the clock protocol data generator 242 is configured to input the parallel data PG_DIN at the PG_CLK clock rate, and output the clock protocol data PG_P at the PG_CLK clock rate so that the clock CLK derived therefrom conforms to the bus protocol of FIG. 4.

Specifically, the clock protocol data generator 242 includes a first multiplexor (MUX) 244, a second MUX 248, and a counter 246 clocked by the clock PG_CLK and operatively connected to respective control terminals of the MUXs 244 and 248. Each of the MUXs 244 and 248 is configured to input the parallel data PG_DIN. Further, the counter 246 is configured such that each tick of the clock PG_CLK advances the counter 246, which applies suitable control signals to the respective MUX control terminals to allow the MUXs 244 and 248 to successively select different pairs of data bits from the parallel data PG_DIN. For example, the MUX 244 may be controlled to select the data bit 15_7 and the MUX 248 may be simultaneously controlled to select the data bit 14_3. The MUX 244 may then provide the bit 15_7 directly to a buffer 254, and provide three (3) inverted bits ~15_7 to the buffer 254 via an inverter 250. Similarly, the MUX 248 may provide the bit 14_3 directly to the buffer 254, and provide three (3) inverted bits ~14_3 to the buffer 254 via an inverter 252. As a result, the buffer 254 includes the data bits 15_7, ~15_7, ~15_7, ~15_7, ~15_7, 14_3, ~14_3, ~14_3, and ~14_3, preferably in eight (8) contiguous locations.

Next, the buffer 254 outputs these 8 bits of clock protocol data PG_P over the bus 118 for subsequent serialization and transmission over the serial line 122 as a portion of the clock CLK. The clock protocol data generator 242 successively processes the data bit pairs 13_7 and 12_3, 11_7 and 10_3, 9_7 and 8_3, 7_7 and 6_3, 5_7 and 4_3, 3_7 and 2_3, and 1_7 and 0_3 in a similar manner.

In a preferred embodiment, the parallel data PG_DIN carried by the 128-bit bus 114 maps to the segregated parallel data PG_D0–PG_D15 carried by the 8-bit buses 116.0–116.15 as follows.

PG_DIN[127:124,63:60]=PG_D15
   PG_DIN[123:120,59:56]=PG_D14
   PG_DIN[119:116,55:52]=PG_D13
   PG_DIN[115:112,51:48]=PG_D12
   PG_DIN[111:108,47:44]=PG_D11
   PG_DIN[107:104,43:40]=PG_D10
   PG_DIN[103:100,39:36]=PG_D9
   PG_DIN[99:96,35:32]=PG_D8
   PG_DIN[95:92,31:28]=PG_D7
   PG_DIN[91:88,27:24]=PG_D6
   PG_DIN[87:84,23:20]=PG_D5
   PG_DIN[83:80,19:16]=PG_D4
   PG_DIN[79:76,15:12]=PG_D3
   PG_DIN[75:72,11:8]=PG_D2
   PG_DIN[71:68,7:4]=PG_D1
   PG_DIN[67:64,3:0]=PG_D0.

Further, every eight (8) consecutive ticks of the clock PG_CLK, the parallel data PG_DIN carried by the 128-bit bus 114 successively maps to the clock protocol data PG_P carried by the 8-bit bus 118 as follows.

PG_DIN[127,~127,~127,~127,59,~59,~59,~59]=PG_P
   PG_DIN[119,~119,~119,~119,51,~51,~51,~51]=PG_P
   PG_DIN[111,~111,~111,~111,43,~43,~43,~43]=PG_P
   PG_DIN[103,~103,~103,~103,35,~35,~35,~35]=PG_P
   PG_DIN[95,~95,~95,~95,27,~27,~27,~27]=PG_P
   PG_DIN[87,~87,~87,~87,19,~19,~19,~19]=PG_P
   PG_DIN[79,~79,~79,~79,11,~11,~11,~11]=PG_P
   PG_DIN[71,~71,~71,~71,3,~3,~3,~3]=PG_P

Figure 3:
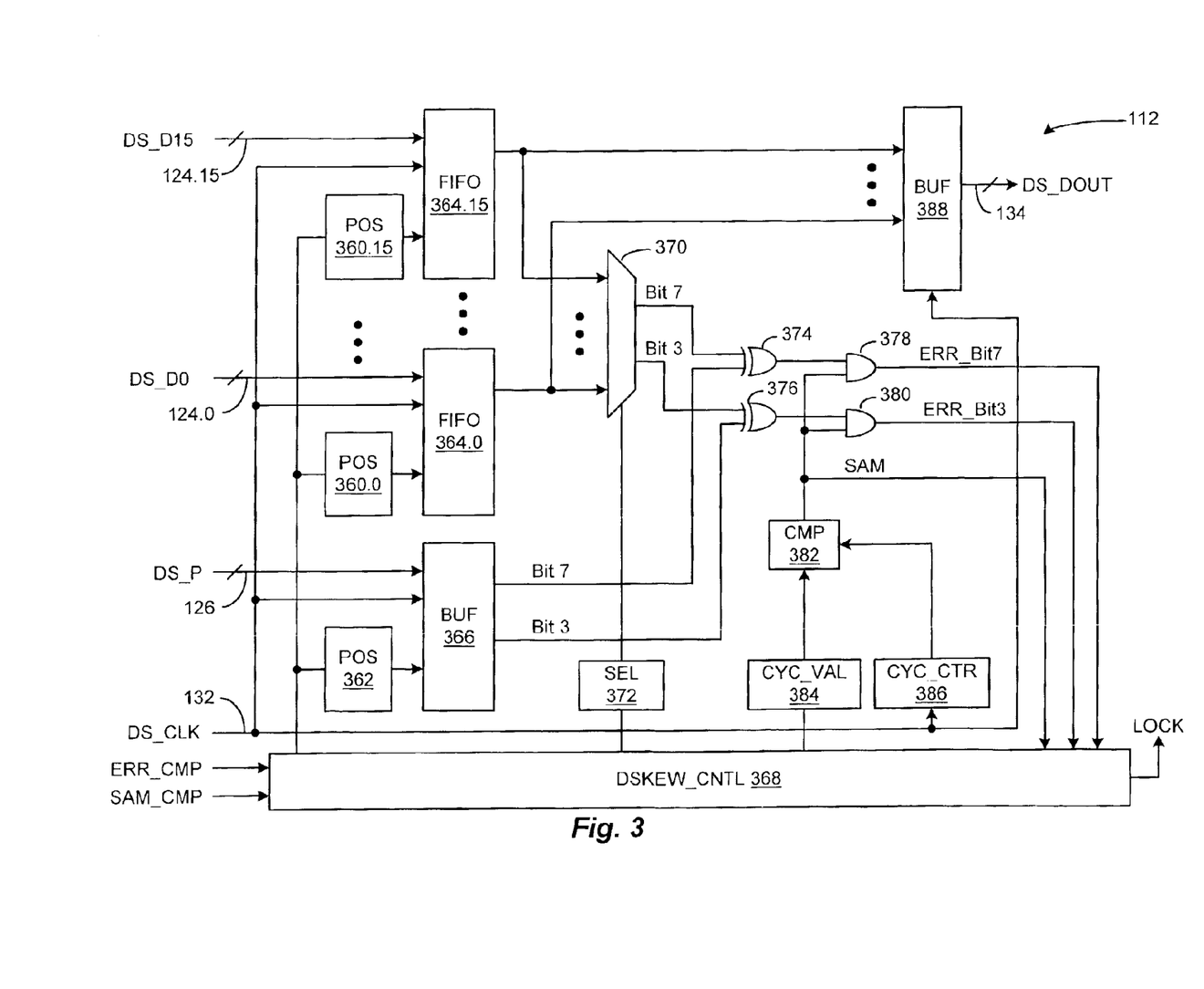
FIG. 3 is a block diagram depicting a de-skew circuit included in the high speed data transmission system of FIG. 1.

FIG. 3 depicts an illustrative embodiment of the de-skew circuit 112 included in the high speed data transmission system 100 (see FIG. 1). In the illustrated embodiment, the de-skew circuit 112 inputs the parallel data DS_D0–DS_DI5 via the respective buses 124.0–124.15 and the clock protocol data DS_P via the bus 126, and outputs the parallel data DS_DOUT over the bus 134. It is noted that the parallel data DS_D0–DS_D15 is derived from the serial data D0–D15, respectively, and the clock protocol data DS_P is derived from the clock CLK. Further, the parallel data DS_DOUT outputted by the de-skew circuit 112 over the bus 134 has the same data ordering as the parallel data PG_DIN originally inputted by the protocol generator 102.

The de-skew circuit 112 uses the clock protocol data DS_P for properly aligning the parallel data DS_D0–DS_D15 to regain the original data ordering of the parallel data DS_DOUT. Specifically, a plurality of First-In First-Out (FIFO) buffers 364.0–364.15 receives the parallel data DS_D0–DS_D15 over the respective buses 124.0–124.15, and a buffer 366 receives the clock protocol data DS_P over the bus 126. Next, the de-skew circuit 112 compares bit values in selected bit positions of the respective FIFO buffers 364.0–364.15 to bit values in selected bit positions of the buffer 366 to determine the relative bit positions of the parallel data DS_D0–DS_D15. The de-skew circuit 112 then uses this information relating to the relative bit positions to align the parallel data DS_D0–DS_D15 for subsequent output over the bus 134 as the parallel data DS_DOUT.

The manner in which the de-skew circuit 112 determines the relative bit positions of the parallel data DS_D0–DS_D15 will be better understood with reference to the following illustrative example, in which the Most Significant Bit (MSB) of the parallel data DS_D15 is located using the alignment information for DS_D15 encoded on the clock protocol data DS_P. First, a de-skew controller 368 applies a first control signal to the FIFO buffer 364.15 via a bit position selection circuit (POS) 360.15, and a second control signal to a MUX 370 via a data selection circuit (SEL) 372. The FIFO buffer 364.15 then serially provides the data DS_D15 to the MUX 370.

In the illustrated embodiment, the FIFO buffer 364.15 is configured to accommodate up to 4 bit times of skew (about 1.6 nsecs) between the first and last arriving parallel data byte DS_D0–DS_D15. The FIFO buffer 364.15 may therefore be configured to store at least 12 data bits. Further, the first control signal applied to the FIFO buffer 364.15 via POS 360.15 may cause the FIFO buffer 364.15 to serially provide 8 data bits to the MUX 370 starting with the data bit in the first bit position ("Bit 7") and continuing with the data bits in the next 7 consecutive bit positions (bits 6–0) of the FIFO buffer 364.15. Moreover, the second control signal applied to the MUX 370 via SEL 372 causes the MUX 370 to provide Bit 7 to an exclusive-or (XOR) gate 374. It is noted that the second control signal also causes the MUX 370 to provide bit 3 ("Bit 3") to an XOR gate 376.

Because of the possible occurrence of data skew in the transmission of the serial data D0–D15 over the 9% serial lines 120.0–120.15, it is uncertain whether Bit 7 corresponds to the actual MSB of the data DS_D15 (i.e., bit 15_7). For this reason, the de-skew controller 368 further applies a third control signal to the buffer 366 via POS 362. For example, POS 362 may cause the buffer 366 to provide the data bit in the MSB position of DS_P to the XOR gate 374. In this example, the data bit in the MSB position of DS_P corresponds to the bit 15_7 encoded on the clock CLK at time interval $T_0$ (see FIG. 4). It is noted that POS 362 also causes the buffer 366 to provide the data bit 14_3 (Bit 3) encoded on the clock CLK at time interval $T_4$ to the XOR gate 376 according to the exemplary bus protocol depicted in FIG. 4.

As a result, the XOR gate 374 compares Bit 7 of the parallel data DS_D15 to the corresponding Bit 7 of the clock protocol data DS_P. In the event both of the values of these bits are either logical high or logical low, the XOR gate 374 outputs a logical low level. In the event these bits have different values, the XOR gate 374 outputs a logical high level. In alternative embodiments, the XOR gate 374 may compare Bit 7 of DS_D15 to the corresponding Bit 7 of DS_P, and the XOR gate 376 may compare Bit 3 of DS_D14 to the corresponding Bit 3 of DS_P, simultaneously.

In the illustrated embodiment, Bit 7 of the parallel data DS_D15 is compared to the corresponding Bit 7 of the clock protocol data DS_P by the XOR gate 374 a desired number of times, as determined by the value SAM_CMP. For example, the de-skew controller 368 may store a value in a cycle value register (CYC_VAL) 384. Further, a cycle counter (CYC_CTR) 386 may be configured to count repeatedly from 0 to the stored cycle value. Because the comparison of Bit 7 of the parallel data DS_D15 to the corresponding Bit 7 of the clock protocol data DS_P occurs only once every 64 ticks in the disclosed embodiment, the stored cycle value equals 64.

In the event a comparator (CMP) 382 detects that the output of CYC_CTR 386 equals the value stored in the CYC_VAL 384, the CMP 382 provides a logical high level (SAM) to an AND gate 378, thereby causing the AND gate 378 to pass the output of the XOR gate 374 to the de-skew controller 368 as a first error signal, ERR_Bit7. It is noted that the logical high SAM level also causes an AND gate 380 to pass the output of the XOR gate 376 to the de-skew controller 368 as a second error signal, ERR_Bit3. The de-skew controller 368 includes a sample counter (not shown) that counts the number of times that SAM is asserted.

In the event the sample counter reaches the value SAM_CMP without ERR_Bit7 being asserted, it is concluded that Bit 7 provided by the MUX 370 to the XOR gate 374 corresponds to the actual MSB of the parallel data DS_D15, i.e., bit 15_7. It is noted that while locating bit 15_7 of the data DS_D15, the second error signal, ERR_Bit3, may be ignored. In the event ERR_Bit7 is asserted before the sample counter reaches the value SAM_CMP, another first control signal is applied to the FIFO buffer 364.15, which may cause the FIFO buffer 364.15 to serially provide 8 data bits to the MUX 370 starting with the bit in the second bit position and continuing with the bits in the next 7 consecutive bit positions of the FIFO buffer 364.15, thereby sliding the FIFO buffer output by one bit.

Further, another third control signal may be applied to POS 362 to cause the buffer 366 to provide a different pair of data bits as Bit 7 and Bit 3 to the XOR gates 374 and 376, respectively. For example, the buffer 366 may provide the data bit in the bit position of DS_P corresponding to the bit ~15_7 encoded on the clock CLK at time interval $T_1$ (see FIG. 4). It is noted that POS 362 may also cause the buffer 366 to provide the data bit ~14_3 encoded on the clock CLK at time interval $T_5$ according to the exemplary bus protocol depicted in FIG. 4. In the event all possible combinations of data bits stored in the FIFO buffer 364.15 and the buffer 366 are compared and ERR_Bit7 is asserted for each possible combination, it is concluded that a bit error has occurred on the serial line 120.15 (see FIG. 1). The above-described steps for locating the actual MSB of the parallel data DS_D15 may then be repeated.

Steps analogous to those described above for locating bit 15_7 of the parallel data DS_D15 using the alignment information encoded on the clock protocol data DS_P may be performed to locate bit 14_3, bit 13_7, bit 12_3, bit 11_7, bit 10_3, bit 9_7, bit 8_3, bit 7_7, bit 6_3, bit 5_7, bit 4_3, bit 3_7, bit 2_3, bit 1_7, and bit 0_3 of the parallel data DS_D14, DS_D13, DS_D12, DS_D11, DS_D10, DS_D9, DS_D8, DS_D7, DS_D6, DS_D5, DS_D4, DS_D3, DS_D2, DS_D1, and DS_D0, respectively. In the event all possible combinations of data bits stored in the FIFO buffer corresponding to any one of the data DS_D14–DS_D0 and the data bits stored in the buffer 366 are compared and ERR_Bit7 (or ERR_Bit3) is asserted for each possible combination, it is concluded that the data bit of least one previous parallel data byte was incorrectly located and the above-described steps are repeated from the start, e.g., starting with the parallel data DS_D15.

Once the single bits (Bits 7 and 3) of each pair of contiguous parallel data bytes are located, the relative bit positions of the pair of data bytes are known and the data byte pair can be properly aligned. In the illustrated embodiment, each contiguous pair of the parallel data bytes DS_D0–DS_D15 is aligned by temporarily storing the data bytes in a buffer 388 with the data bits of the data byte pair in their original order. Next, the de-skew controller 368 asserts the control signal LOCK, and the buffer 388 outputs the aligned parallel data DS_D0–DS_Dl5 over the bus 134 as the parallel data DS_DOUT such that the data DS_DOUT has the same data ordering as the parallel data PG_DIN originally inputted by the protocol generator 102.

In the disclosed embodiment, while the control signal LOCK is asserted, the de-skew circuit 112 continues to compare a single bit (Bit 7 or Bit 3) of each incoming parallel data byte DS_D15–DS_D0 with the corresponding alignment information encoded on the clock protocol data DS_P using the above-described steps. The de-skew controller 368 includes an error counter (not shown) that counts the number of times that ERR_Bit7 or ERR_Bit3 is asserted during these continuing comparisons. It is noted that the sample counter included in the de-skew controller 368 also continues to count the number of times that SAM is asserted. In the event the error counter reaches the value ERR_CMP before or at the time the sample counter reaches the value SAM_CMP, the control signal LOCK is de-asserted and the above-described steps are repeated from the start, e.g., starting with the parallel data DS_D15.

It will further be appreciated by those of ordinary skill in the art that modifications to and variations of the above-described system and method for transmitting parallel data over a plurality of high speed serial lines may be made without departing from the inventive concepts disclosed herein. Accordingly, the invention should not be viewed as limited except as by the scope and spirit of the appended claims.

What is claimed is:

1. A method of transmitting parallel data to a destination over a plurality of serial data lines, comprising the steps of:
   segregating the parallel data into a plurality of parallel data words, each parallel data word comprising a plurality of data bits;
   converting the plurality of parallel data words to respective serial representations of the data words;

transmitting the respective serial representations of the data words to the destination over the plurality of serial data lines;

transmitting a clock signal to the destination over a clock line in parallel with the plurality of serial data lines, the clock signal having at least one data bit of each parallel data word encoded thereon;

converting the transmitted serial representations of the data words to parallel form to regenerate the plurality of parallel data words;

aligning the regenerated parallel data words using the respective data bits encoded on the clock signal; and regenerating the parallel data from the aligned parallel data words.

2. The method of claim 1 wherein the clock signal has a predetermined clock rate, and the first transmitting step comprises transmitting the respective serial representations of the data words over the plurality of serial data lines at the predetermined clock rate.

3. The method of claim 1 wherein the second transmitting step comprises transmitting the clock signal to the destination over the clock line, the clock signal having a single data bit of each parallel data word encoded thereon.

4. The method of claim 3 wherein the second transmitting step further includes transmitting the clock signal to the destination over the clock line, the clock signal having an edge density sufficient to allow recovery of the clock signal at the destination.

5. The method of claim 1 wherein the aligning step comprises converting at least a portion of the data bits encoded on the clock signal to parallel form to generate protocol data, selecting respective bit positions in each parallel data word and the protocol data, and comparing the data bits in the selected bit positions of the parallel data word and the protocol data to locate the at least one data bit of the parallel data word.

6. The method of claim 5 wherein the aligning step further includes aligning contiguous pairs of parallel data words based on the respective locations of the at least one data bit of the contiguous parallel data word pairs.

7. The method of claim 1 wherein the first transmitting step comprises transmitting the respective serial representations of the data words to the destination over the plurality of serial data lines at a serial data transmission rate of at least 2.5 GHz.

8. A system for transmitting parallel data to a destination, comprising:

a protocol generator configured to (1) segregate the parallel data into a plurality of parallel data words, each parallel data word comprising a plurality of data bits, and (2) generate protocol data comprising at least one data bit of each parallel data word;

a plurality of parallel-to-serial converters configured to convert the plurality of parallel data words to respective serial data and convert the protocol data to a clock signal having the at least one data bit of each parallel data word encoded thereon;

a plurality of serial data lines configured to transmit the respective serial data to the destination;

a clock line configured to transmit the clock signal to the destination;

a plurality of serial-to-parallel converters configured to convert the respective serial data to parallel form to regenerate the plurality of parallel data words and convert at least a portion of the data encoded on the clock signal to parallel form to regenerate the protocol data; and a de-skew circuit configured to (1) align the regenerated parallel data words using the at least one data bit of each parallel data word included in the protocol data, and (2) regenerate the parallel data from the aligned parallel data words.

9. The system of claim 8 wherein the de-skew circuit is further configured to select respective bit positions in each parallel data word and the protocol data, and compare the data bits in the selected bit positions of the parallel data word and the protocol data to locate the at least one data bit of the parallel data word.

10. The system of claim 9 wherein the de-skew circuit is further configured to align contiguous pairs of parallel data words based on the respective locations of the at least one data bit of the contiguous parallel data word pairs.

11. The system of claim 8 wherein the plurality of parallel data words comprises a plurality of contiguous pairs of parallel data words, and the plurality of serial data lines are configured to transmit serial data corresponding to the respective contiguous parallel data word pairs during successive time intervals.

12. The system of claim 11 wherein the protocol generator is configured to segregate the parallel data into the plurality of parallel data words, each parallel data word comprising 8 data bits.

13. The system of claim 12 wherein each contiguous parallel data word pair comprises a first parallel data word and a second parallel data word, the first and second parallel data words comprising respective upper nibbles and respective lower nibbles, and wherein the most significant bit of the upper nibble of the first parallel data word and the most significant bit of the lower nibble of the second parallel data word are encoded on the clock signal.

14. The system of claim 13 wherein the clock signal has an edge density sufficient to allow recovery of the clock signal at the destination.

* * * * *

UNITED STATES PATENT AND TRADEMARK OFFICE
CERTIFICATE OF CORRECTION

PATENT NO. : 6,889,272 B1
APPLICATION NO. : 10/016540
DATED : May 3, 2005
INVENTOR(S) : Lawrence Aaron Boxer et al.

It is certified that error appears in the above-identified patent and that said Letters Patent is hereby corrected as shown below:

Column 3, line 29, "comparisons)." should read --comparison(s).--;

Column 6, line 13, "$T_8-T_5$" should read --$T_8-T_{15}$--; and

Column 8, line 63, delete "9%".

Signed and Sealed this

Eighteenth Day of July, 2006

JON W. DUDAS
*Director of the United States Patent and Trademark Office*